A. RAMÉN & K. J. BESKOW.
METHOD FOR CHLORIDIZING ROASTING OF ORES.
APPLICATION FILED MAY 23, 1911.
1,124,519.
Patented Jan. 12, 1915.
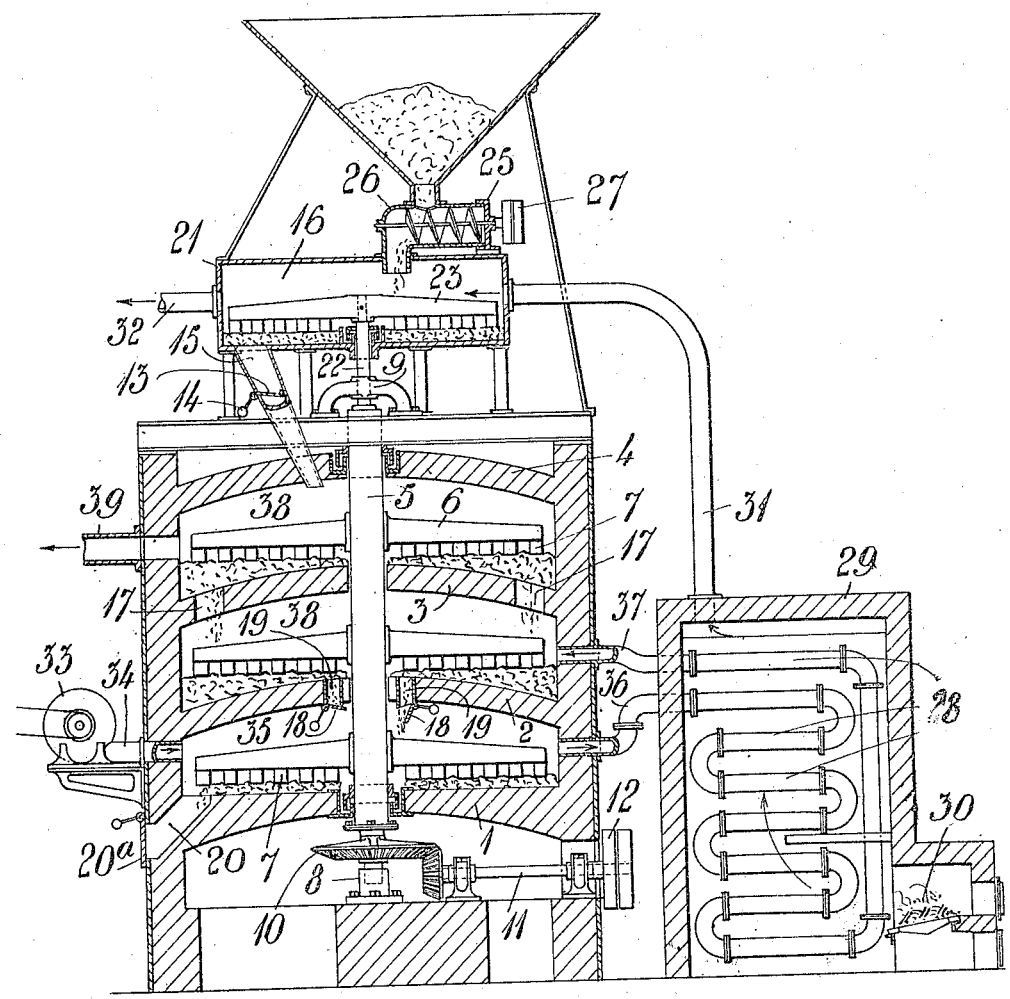
WITNESSES:
John C. Sanders
Harry E. Quinn
INVENTORS:
Arthur Ramén
Knut Jakob Beskow,
BY
ATTY

UNITED STATES PATENT OFFICE.

ARTHUR RAMÉN AND KNUT JAKOB BESKOW, OF HELSINGBORG, SWEDEN.

METHOD FOR CHLORIDIZING ROASTING OF ORES.

1,124,519.   Specification of Letters Patent.   Patented Jan. 12, 1915.

Application filed May 23, 1911. Serial No. 628,909.

*To all whom it may concern:*

Be it known that we, ARTHUR RAMÉN and KNUT JAKOB BESKOW, subjects of the King of Sweden, residing at Villa Margit, Olympia, Helsingborg, and S. Storgatan 19, Helsingborg, Sweden, have invented new and useful Improvements in Methods for Chloridizing Roasting of Ores, of which the following is a specification.

In chloridizing roasting of ores, a process which is generally performed, as is well known, by treating the ore, mixed with chlorids, (common salt), at roasting temperature while introducing atmospheric air, it has been difficult to heat the ore to the temperature required for the process. For this purpose, either reverberatory furnaces have been used, in which the ore has been heated by its contact with combustion gases, or muffle furnaces, in which the ore has received the necessary amount of heat through heated brick-work surfaces. Both these methods possess disadvantages of different kinds. When open reverberatory furnaces are used, the gases developed from the roasted material (the ore and the chlorid) are mixed with combustion gases. As the gases from the roasted material contain large quantities of hydrochloric acid, sulfuric acid, etc., which preferably should be condensed in as large quantities and as high concentration and pureness as possible, it is obvious that the mixing with the combustion gases is very objectionable. This disadvantage is avoided in using muffle furnaces, but the latter, on the contrary, are uneconomical as regards heat, especially as the muffle walls, which are bad conductors of heat, must be of a considerable thickness on account of the corrosive properties of the acid gases and in view of the required mechanical strength of the furnaces.

The difficulty of supplying heat for the process has become of somewhat less importance than before, since mechanical stirring appliances in the furnaces have come into use by which means not only the operating cost has been reduced, but also the advantage has been gained, that a less amount of heat is required for the furnace. This is due partly to the fact that on account of the more intimate contact between the ore particles and the air and the quicker reaction caused thereby a smaller quantity of air is required than in the hand-stirring furnaces and thus a reduced cooling action is obtained. It is also due partly to the fact that on account of the speedy reaction the furnace dimensions can be made smaller, whereby the loss of heat by radiation, etc., are essentially reduced. If the aforesaid difficulties in supplying heat are not as difficult to overcome in the future as at present, when chiefly hand-stirring furnaces are employed, it still remains a very desirable object to try to avoid the difficulties connected with the direct heating by combustion gases as well as with the heating in a muffle in mechanically operated furnaces.

According to the present invention, by which the desired object is attained the air required for the oxidation of the material to be roasted is preheated to the roasting temperature whereby in mechanical furnaces, where the required supply of heat is comparatively small, a quantity of heat can be supplied to the ore which is sufficient, with a suitable composition of the latter, to maintain the roasting process when once initiated.

The heating of the air previously to its introduction in the roasting furnace should be effected by means of superheaters of such construction as to prevent the air from being mixed to any great extent with the combustion gases serving to heat the superheater. For such purpose, a system of pipes or channels can be used, which are heated from the outside by combustion gases, while the air passes inside, or vice versa.

Of course it may be advantageous to utilize the heat contained in the roasted ore by passing air over the same in a special compartment or zone of the chloridizing furnace or outside the said furnace. The air thus somewhat preheated is introduced in the superheater and finally when it has attained a suitable temperature in the chloridizing furnace or the compartment or zone of the same, in which the chloridizing process goes on or in which the supply of heat is required.

It is obvious, that the combustion gases employed for heating the air superheater, may be used, since only part of the heat contained has been utilized in the superheater, for directly drying or preheating the ore or mixture of chlorid and ore destined to be subjected to the chloridizing process.

In order that the present method may be fully understood an apparatus for carrying out the same will now be described with reference to the accompanying drawing, where it is shown in a longitudinal vertical section.

1, 2, 3 are the different roasting hearths, 4 the roof and 5 the main shaft of the furnace, said shaft carrying stirring arms 6 provided with obliquely set teeth 7 in a known manner. The shaft 5 which is journaled in the bottom bearing 8 and in the neck bearing 9 is driven by means of a toothed gear 10 and an intermediary shaft 11 from the pulleys 12. The material to be roasted enters through a channel 15 provided with an automatically closing check valve 13 (with a counterweight 14) from a drying or preheating device 16. On the bottom of the uppermost furnace chamber or compartment, the material in a known manner is transported by the stirring mechanism from the center to the periphery where it falls down through the openings 17 to the second compartment of the chloridizing furnace. In the said compartment, the material is transported from the periphery toward the center where it falls down through channels 19 provided with automatically closing check valves 18 to the lowest compartment, from which the material is finally discharged through the channel 20 which is also provided with an automatic check valve 20ª so as to permit only the solid material but no appreciable gas quantities to pass. The drying or preheating device 16 placed on the top of the furnace consists of a cylindrical box 21 which may be of sheet metal and is centrally traversed by a shaft 22 directly connected to the main shaft 5. On the said shaft 22 a stirring device 23 similar to those of the furnace chambers is mounted, said device acting to move the material introduced at the center toward the periphery where it leaves the box through the channel 15. The material is fed into the drying device from the feed hopper by a worm-conveyer 25 mounted in a casing 26 and driven by a pulley 27.

To the side of the furnace is placed a superheater for air consisting of a system of pipes 28 surrounded by a brick-work structure 29 with a furnace 30. The combustion gases from the furnace heat the pipes 28 and leave the superheater through the pipe 31 discharging into the preheater 16 in which the gases heat the material before they are led off to a chimney through the conduit 32.

By means of a fan 33 air is blown through a pipe 34 into the cooling compartment 35, from where it enters the pipes 28 through the conduit 36. The same air then passes through the conduit 37 into the chloridizing compartment 38 of the furnace. Through the pipe 39 the gases are discharged which are produced in the chloridizing process.

The arrangement thus described works in the following manner: The mixture of ore and chlorids is introduced by the worm-conveyer 25 into the drying device 16 where it is heated by means of combustion gases from the superheater 29. Then it falls down through the channel 15 into the chloridizing compartments 38 of the furnace where the reaction between the salt and the sulfur and metallic oxids of the ore takes place under the action of the air and the heat supplied by the hot air coming from the pipes 28 together with the heat produced by the reaction itself. When the material leaves the chloridizing compartments through the valves 18, the reaction is practically completed. In the cooling compartment 35, the material delivers part of its heat to the air introduced there and leaves the furnace at a temperature which is not higher than is desirable for the following lixiviation. The air forced in by means of the fan 33 takes up a rather large quantity of heat in the compartment 35 and is then further heated in the pipes 28, so that its temperature when entering the chloridizing compartment will be considerably high. The combustion gases from the furnace 30 first will heat the air indirectly in the pipes 28 and then the material to be roasted indirectly in the preheater 16.

In the way described, it is possible to supply the heat to the chloridizing compartment necessary for the reaction in an economical manner without the use of muffles and without diluting the acid gases in the chloridizing compartment with combustion gases.

Having now particularly described the nature of our invention and the manner of its operation, what we claim is:—

1. A process for chloridizing roasting of ores, consisting in feeding a mixture of ore and chloridizing means from one compartment to another in a furnace, stirring the mixture, heating air independently of the furnace by means of fuel in a superheater so arranged that the air is not mixed with the products of combustion of the fuel, and introducing said air into the compartment where the chloridizing process takes place.

2. A process for chloridizing roasting of ores, consisting in feeding a mixture of ore and chloridizing means from one compartment to another in a furnace, stirring the mixture, preheating air by contact with hot roasted ore, further heating it by means of fuel in a superheater so arranged that the air is not mixed with the combustion gases of the fuel, and introducing said air into the compartment where the chloridizing process takes place.

3. A process for chloridizing roasting of ores, consisting in feeding a mixture of ore and chloridizing means from one compartment to another in a furnace, stirring the mixture, heating air independently of the furnace by means of fuel in a superheater so arranged that the air is not mixed with the products of combustion of the fuel, preheating new quantities of ore by means of said products of combustion previously to their introduction into the chloridizing compartment, and introducing said heated air into the compartment where the chloridizing process takes place.

In testimony whereof we have signed our names to this specification in the presence of two subscribing witnesses.

ARTHUR RAMÉN.
KNUT JAKOB BESKOW.

Witnesses:
G. SCHLYTER,
R. DRILL.